United States Patent [19]

O'Quinn et al.

[11] Patent Number: 4,736,910
[45] Date of Patent: Apr. 12, 1988

[54] AIRCRAFT WITH INTERCHANGEABLE FUSELAGE

[75] Inventors: Russell P. O'Quinn, Long Beach; Irven H. Culver, Playa Del Rey, both of Calif.

[73] Assignee: Flight Concepts Limited Partnership, Englewood, Calif.

[21] Appl. No.: 14,183

[22] Filed: Feb. 11, 1987

Related U.S. Application Data

[63] Continuation of Ser. No. 639,454, Aug. 10, 1984, abandoned.

[51] Int. Cl.$^4$ .............................................. B64C 1/00
[52] U.S. Cl. ..................................... 244/120; 244/118.2
[58] Field of Search ................... 244/117 R, 119, 120, 244/118.1, 118.2, 2, 140, 13; 339/64 M

[56] References Cited

U.S. PATENT DOCUMENTS

| | | | |
|---|---|---|---|
| 2,504,422 | 4/1950 | Johnson et al. | 244/120 |
| 3,017,137 | 1/1962 | Helmke et al. | 244/120 |
| 3,094,364 | 6/1963 | Lingg | 339/64 M |
| 3,116,896 | 1/1964 | Sigler et al. | 244/2 |
| 3,171,620 | 3/1965 | Walley et al. | 244/120 |
| 3,640,492 | 2/1972 | Star | 244/120 |
| 3,703,265 | 11/1972 | Troitiwo | 244/13 |
| 3,881,671 | 5/1975 | Bouchnik | 244/140 |
| 3,947,080 | 3/1976 | Ege | 339/64 M |
| 4,447,025 | 5/1984 | Bock et al. | 244/118.2 |
| 4,449,679 | 5/1984 | McComas | 244/120 |

FOREIGN PATENT DOCUMENTS

| | | | |
|---|---|---|---|
| 8337 | 6/1915 | United Kingdom | 244/120 |
| 731660 | 6/1955 | United Kingdom | 244/120 |

Primary Examiner—Galen Barefoot
Attorney, Agent, or Firm—Finnegan, Henderson, Farabow, Garrett & Dunner

[57] ABSTRACT

An aircraft is set forth having a fuselage (22) which terminates at a forward bulkhead (38). Secured to the fuselage (22) to complete the aerodynamic shape of the aircraft is one or a number of interchangeable, mission specific nose modules (46). A plurality of sleeves (66) is disposed on the fuselage (22) at the forward bulkhead (38) and a like number of corresponding pins (106) are positioned at the nose module (46), reception of the pins (106) into the sleeves (66) as the nose module (46) is mated to the fuselage (22) providing for first gross positional alignment and, as the pins (106) approach full insertion into the sleeves (66), fine positional alignment for interconnection. Couplers (68, 70) are included to provide connection between any electronics in the nose module (46) and monitoring/control electronics disposed on the fuselage (22) and its cockpit (26). The couplers can accommodate six degrees of malalignment to receive the other fixed portion of the coupling for interconnection thereof. Upon mating of the nose module (46) to the fuselage (22), connectors such as over center clamps (112) afix the nose module (46) to its fuselage (22). If desired, the aircraft may also be provided with interchangeable tail modules (126) which include pins (106) and couplers (68, 70) like the nose modules (46) to facilitate their interconnection to and interchange between aircraft. The interchangeability of the tail and nose modules (126, 46) between aircraft gives a small contingent of such aircraft a wide variety of mission capabilities.

8 Claims, 7 Drawing Sheets ately easily be a cockpit and wings attached thereto. A
AIRCRAFT WITH INTERCHANGEABLE FUSELAGE This application is a continuation, of application Ser. No. 06/639,454, filed Aug. 10, 1984, now abandoned.

FIELD OF THE INVENTION

This invention relates to aircraft and, more particularly, to aircraft which can quickly be modified and adapted to fly any one of a variety of missions.

BACKGROUND OF THE INVENTION

Heretofore, aircraft have been designed and built to carry out one or a number of several specific missions. An example of a specific mission is electronic countermeasures, which encompasses a variety of different missions such as electronic jamming of electromagnetic signals, data gathering, or interception of communications, to name a few. Other missions for which specific aircraft have been designed or modified include surveillance, reconnaissance including photoreconnaissance, ferrying of equipment, airborne tanker, various roles as a fighter/interceptor and as a trainer. There are, of course, other missions often carried out by specific aircraft, the above being listed only by way of illustration.

Given the missions sought to be carried out, the typical approach is to design an entire aircraft or build modifications into the aircraft to enable it to carry out that specific mission. That is, a specific aircraft or a modified aircraft adapted for electronic countermeasures is not well suited to function as a reconnaissance aircraft or fighter/interceptor. Requiring a plurality of aircraft, each adapted to carry out a specific mission, is expensive both in acquisition and maintenance. It would be advantageous from a cost standpoint to provide one or more aircraft which can quickly and easily be modified so as to be capable of carrying out any one of the numerous missions, as set forth above, or other types of missions. If the foregoing approach is to be successful, it is important that the modification be accomplished quickly, for example while the aircraft is being refueled, and easily by personnel who may have only limited skill.

In U.S. Pat. No. 3,640,492, issued Feb. 1, 1972 to Starr, a modular aircraft structure is disclosed. However, the approach as suggested by Starr, of piecemeal replacement of separate, relatively small modules on an aircraft is not entirely satisactory in that modification of the aircraft would be time consuming. Changes in, for example, military conditions may mandate that the aircraft be modified as soon as possible to carry out a different mission. Requiring personnel to interchange up to twelve modules would be time consuming. To quickly modify the aircraft would require a number of personnel working simultaneously to effectuate that end.

Regarding the modular approach, it would be useful to provide a set of modules which are interchangeable between different, similarly designed aircraft. This would make a small contingent of aircraft versatile to carry out individually or simultaneously a wide variety of missions as determined by the avionics provided in the set of modules.

SUMMARY OF THE INVENTION

There is, therefore, provided in the preferred embodiments of the present invention, an aircraft having a fuselage with a cockpit and wings attached thereto. A powerplant or several powerplants, such as jet engines, turbo props or reciprocating engines are provided on the fuselage and/or the wings. The fuselage has a rear tail which includes the horizontal and vertical stabilizers, rudder and elevators.

Forward of the cockpit the fuselage terminates at a forward bulkhead. Secured to the fuselage, to complete the aerodynamic shape of the aircraft, is one of a number of interchangeable nose modules. The nose modules are adapted to be completely interchangeable between like aircraft. For this purpose, coupling means are provided. The coupling means are responsive to the motion of any nose module toward the fuselage forward bulkhead, into mating engagement therewith, for defining and establishing a predetermined, mated positional relation of the nose module on the fuselage. The coupling means includes cooperating, progressively engageable guide elements distributed between the nose module and the fuselage. Upon initial engagement between the nose module and fuselage, the guide elements establish a condition of gross positional alignment of a nose module to the fuselage. Further engagement causes the guide elements to define a condition of fine positional alignment to mate the nose module to the fuselage. Preferably the guide elements include a plurality of sleeves and a like number of corresponding pins distributed between the nose module and the fuselage, reception of the pins into the sleeves as the nose module is mated to the fuselage providing for first gross positional alignment and, as mating proceeds, fine alignment for interconnection.

To provide for the connection between avionics in the nose module and monitoring/control electronics disposed in the fuselage and its cockpit, the coupling means includes electrical connection means. The electrical connection means are distributed between the nose module and the fuselage. Upon mating of a nose module to the fuselage, electrical connection between equipment at the nose and components in the fuselage is made. Preferably, the electrical connection means include cooperating plug-like pairs of couplers, one coupler of each pair being mounted to the fuselage and the other to the nose module. The couplers of each pair are mounted and cooperatively arranged relative to each other to accommodate six degrees of malalignment (freedom of motion) between them and to mate with each other in response to mating of the nose module to the fuselage. During mating of a selected nose module to the fuselage, the couplers of each pair move in response to alignment of the nose module to the fuselage to engage with each other and to mate to establish the desired functional connection of the nose module to the fuselage. Upon mating of the nose module to the fuselage, attaching means such as over-center clamps afix the nose module to its fuselage.

If desired, the aircraft may also be provided with interchangeable tail modules. As with the nose modules, the tail modules are interchangeable between one or a population of aircraft of like design to give a small contingent of aircraft a wide variety of mission capabilities. The tail modules may include different avionics such as rear-looking radar. To mate a selected module to the fuselage, the fuselage is provided with a rear bulkhead.

Coupling means are distributed between the tail modules and the fuselage like those of the nose module. Also, the coupling means includes electrical connection means, like those between the nose modules and the fuselage, to interconnect electronic equipment. Again, attaching means are used to afix the tail module to the fuselage for operation of the aircraft.

To provide for operation of the control surfaces (i.e., rudder, elevators), the fuselage and each tail module are provided with push-push type of controls. Upon mating of any one of several tail modules to the fuselage, pilot operation of the controls at the cockpit results, through a push-push connection, to the operation to the corresponding control surfaces at the tail module.

By providing for interchangeable nose modules and/or tail modules it can be understood that one or a small contingent of such aircraft can be quickly modified or changed to fly any one of a wide variety of missions. The interchange of nose modules and/or tail modules to modify the aircraft is done quickly and automatically by disconnecting such module from the fuselage and pulling it away therefrom. The replacement module is thereafter mated to the fuselage, coupling means being provided for first gross and then fine alignment with the fuselage. The coupling means include suitable electrical connection means for the automatic connection of avionics when the module mates to the fuselage. Accordingly, highly trained personnel are not required to make the interchange and the interchange can be done by a relatively small number of personnel. Furthermore, the coupling means results in the fast and easy modification of the aircraft. Connection of electronics and controls is automatic as the module is mated to the fuselage. The ability to quickly and easily modify one or several aircraft to fly any one of a variety of missions is cost effective, since a plurality of aircraft, each adapted to fly a specific mission, are not required.

BRIEF DESCRIPTION OF THE DRAWINGS

These and other features and advantages of the present invention, will be appreciated as the same become better understood by reference to the following detailed description of the presently preferred embodiments, when considered in connection with the accompanying drawings wherein.

DETAILED DESCRIPTION

Figure 1:
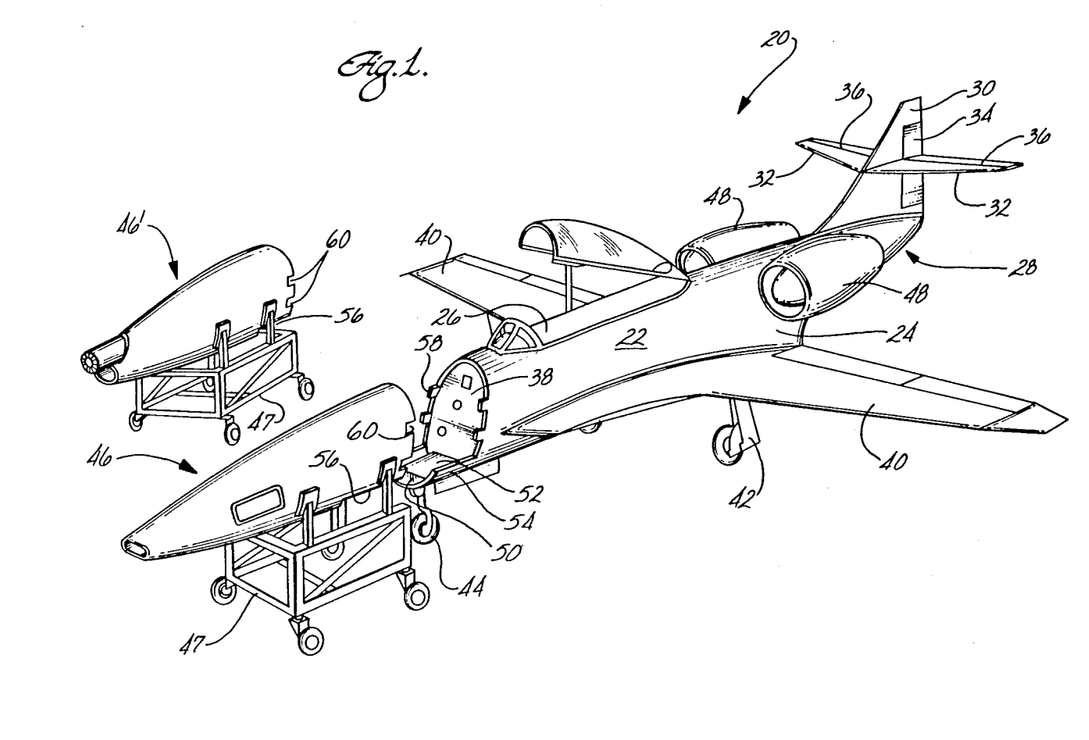
FIG. 1 is a perspective view of the aircraft showing several nose modules.

Turning to the drawings, FIG. 1 shows an aircraft 20 according to the present invention. The aircraft 20 has a fuselage 22 which includes an internal framework (not shown) covered by an outer skin 24 which may be aluminum. Located in the fuselage 22, as is well known, is a cockpit 26 adapted to seat the pilot and, if desired, a navigator, instructor or the like. At the cockpit 26 instrumentation and monitors (not shown) are provided to interface with avionics to monitor the flight of the aircraft 20 and also to control, monitor and otherwise communicate with instruments and equipment, as will hereinafter be described. Disposed at the rear of the aircraft 20 is a tail assembly 28 which can be removable as described below and which includes vertical and horizontal stabilizers 30 and 32 supporting, respectively, the movable control surfaces embodied as the rudder 34 and elevators 36. Controls are provided in the cockpit for operating the control surfaces at the wings and tail as is well known in the art. Opposite the tail assembly 28, the fuselage 22, ahead of the cockpit 26, terminates at a forward bulkhead 38.

Attached to the fuselage 22 are wings 40 provided with internal fuel tanks (not shown). Each wing can be adapted to hang auxiliary fuel tanks, weapons or instrumentation. Together the wings 40 and fuselage 22 house retractible tricycle landing gear embodied as a pair of wing wheels 42 and nose wheel 44.

Interchangeably secured to the fuselage 22 in a manner described in detail below, to complete the aerodynamic configuration of the aircraft 20, is a nose module 46 selected from a population of like or similar nose modules.

To power the aircraft 20, means such as jet engines 48 secured to the fuselage 22 aft of the cockpit 26 are provided. Of course, it is understood that the jet engines, or propeller engines, could also be disposed at or hung beneath the wings 40. The positioning and type of power plant for the aircraft 20 must be such as not to interfere with the nose module 46.

To adapt the aircraft 20 to fly any one of a variety of missions, each nose module 46 of a population of such nose modules may be interchangeably connected to the aircraft 20, or to a plurality of such aircraft at different times. For example, the aircraft 20 shown in FIG. 1 may be provided with a nose module 46 which adapts the aircraft 20 to fly an electronic countermeasures mission. Upon return of the aircraft 20 to base, the electronic countermeasures nose module 46 can be removed via a suitable cart 47 (and, if desired, secured to another similar aircraft) and replaced with a different nose module 46', which contains equipment to adapt the aircraft 20 to fly a photo-reconnaissance mission. The foregoing gives the aircraft the capability to fly one or several desired mission functions. For example, nose modules can be provided to enable the aircraft 20 to fly any one of the following mission functions: electronic countermeasures which may include radar and communications jamming, surveillance, photoreconnaissance, ferrying of equipment, fighter/interceptor, trainer, or tanker, among other mission functions. In that each nose module contains substantially all the electrical and mechanical equipment enabling the aircraft 20 to carry out the specified mission, the quick and easy interchange of nose modules onto and between aircraft makes a single aircraft or a small contingent of aircraft highly versatile in mission capabilities. Furthermore, since the mission-related equipment is housed principally in nose module 46, the interchange can be accomplished quickly and by a minimum number of personnel, for example, as the aircraft 20 is refueling.

Figure 2:
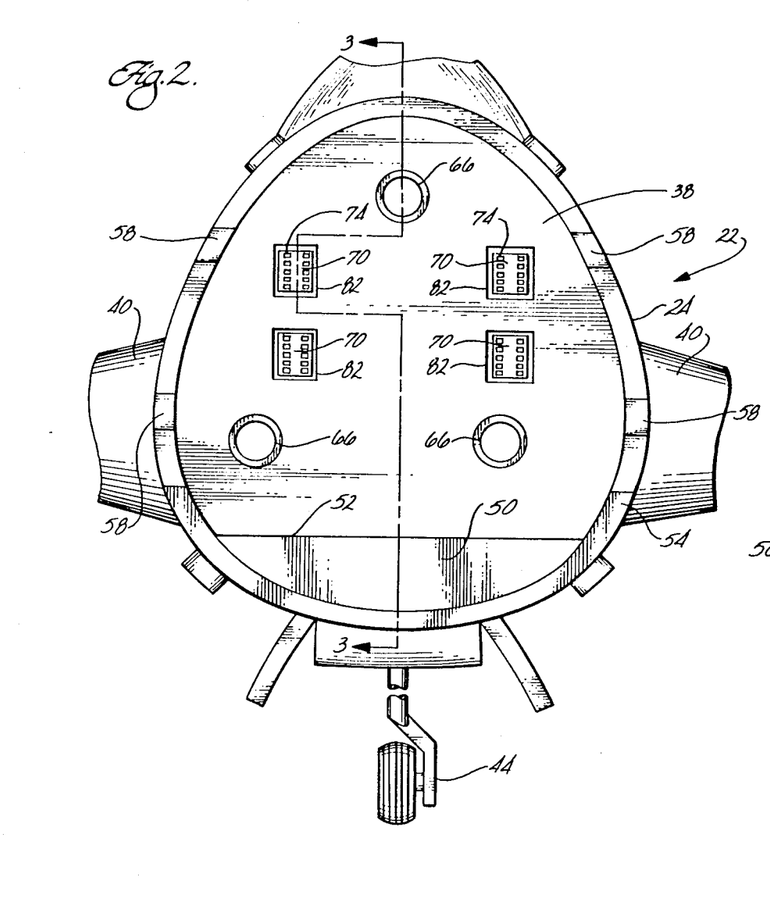
FIG. 2 is a front view of the aircraft fuselage with the nose module removed.
Figure 3:
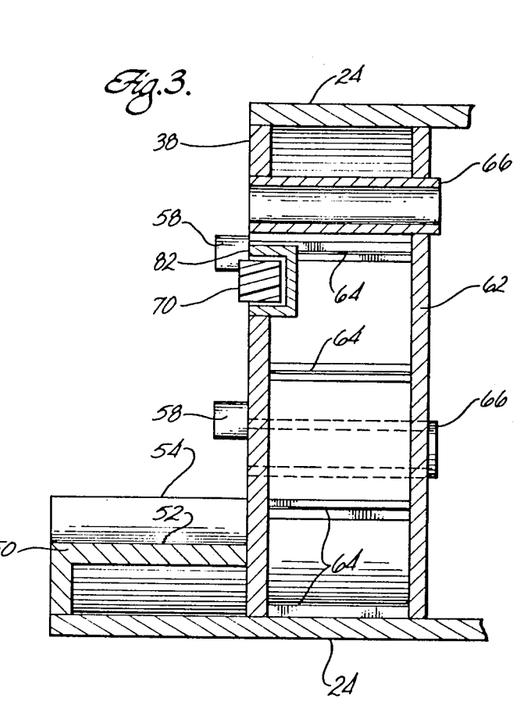
FIG. 3 is a side section view of the forward portion of the fuselage taken along line 3—3 of FIG. 2 with the nose wheel removed for clarity.

While the following description is directed to nose module 46, it is to be understood that the description applies to each such nose module. Furthermore, while the description sets forth the invention in a setting involving principally a single aircraft, it is to be noted that the invention applies to each of a population of like or similar aircraft. To provide for the interchangeability of nose modules 46, the fuselage 22 has a tongue 50 extending forward from the forward bulkhead 38. As shown in FIGS. 1 through 3, the tongue 50 is adapted to mate with, and at least partially support the nose module 46. The tongue 50 is associated with at least a portion of the retraction mechanism of nose wheel 44 and is somewhat semicylindrical, preferably having a horizontal upper surface 52. Upper surface 52 extends between a pair of opposing curbs 54 defined by the aircraft skin 24. The tongue upper surface 52 is adapted to provide vertical and moment support for the nose module 46. As will be described below, the nose module 46 is provided with a mating recess 56 which receives the tongue 50.

To provide a degree of alignment between the nose module 46 and the fuselage 22, the skin 24 projects forwardly of the forward bulkhead 38 to define four spaced apart tabs 58. The tabs 58, when the nose module 46 is mated to the fuselage 22, are received into mating notches 60 on the nose module 46.

The fuselage forward bulkhead 38, shown in FIGS. 1 through 3, consists of a plate of aluminum or steel which is incorporated into the framework of the fuselage 22. The fuselage framework, as alluded to above, not only provides skeletal structure for the fuselage 22 but also supports the wings 40, tail assembly 28 and jet engines 48. The skin 24 is secured to the framework in a manner well known in the art to define the aerodynamic configuration for the aircraft 20. As is well known, the framework includes a plurality of rib bulkheads 62 (see FIG. 3) aft of the forward bulkhead 38 which are incorporated into the fuselage framework to provide for lateral support between the rib bulkheads 62 and forward bulkhead 38, spars 64 or the like are provided therebetween. The skin 24 can be riveted to the spars 64 and bulkheads.

To guide and support the nose module 46 onto the fuselage 22 by, in effect, incorporating the nose module 46 into the fuselage framework and into the overall aerodynamic configuration of the aircraft, coupling means are distributed between the nose module 46 and the fuselage 22. The coupling means are responsive to the motion of any selected nose module toward the fuselage forward bulkhead 38, in mating a nose module to a fuselage, to define and establish a predetermined, mated, positional relationship of the nose module to the fuselage. Such coupling means are provided by guide elements which include a plurality of sleeves 66 disposed at and through the forward bulkhead 38. The sleeves 66, which may be steel, extend longitudinally from the forward bulkhead 38 toward the cockpit 26 and are supported at the forward bulkhead 38 and one or more rib bulkheads 62 as best shown in FIG. 3. Each sleeve 66 preferably has a uniform diameter, the sleeves 66 being arranged in, for example, a triangular array at the forward bulkhead 38. It is to be understood that the number of sleeves and their arrangement at the bulkhead can vary as required for support of the nose module 46, but the number and arrangement of sleeves is uniform between all fuselages of all aircraft of a given type or kind. The guide elements provide for the alignment and overall coupling of a selected nose module to a selected fuselage.

Figure 4:
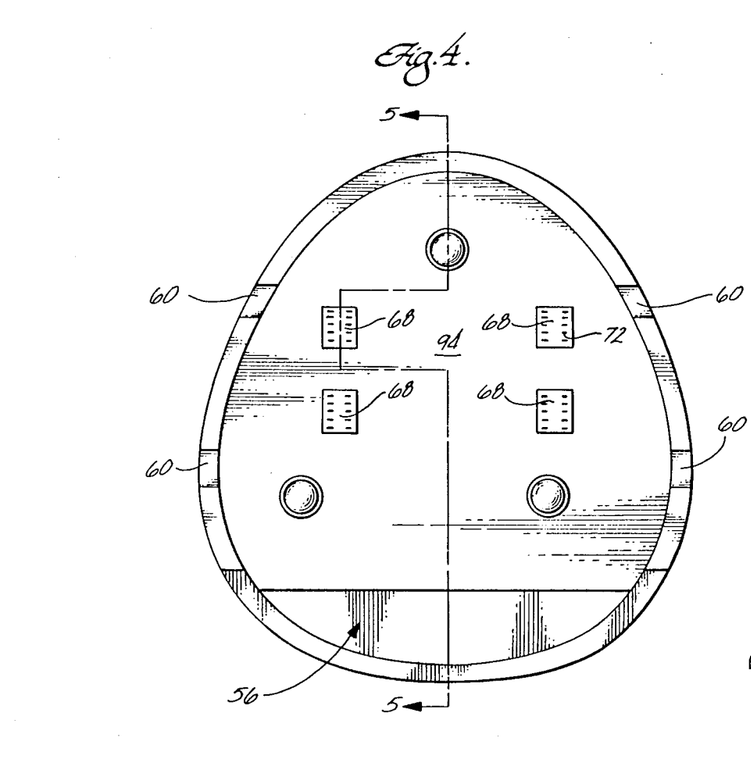
FIG. 4 is a rear view of the nose module adapted for interconnection to the fuselage.
Figure 5:
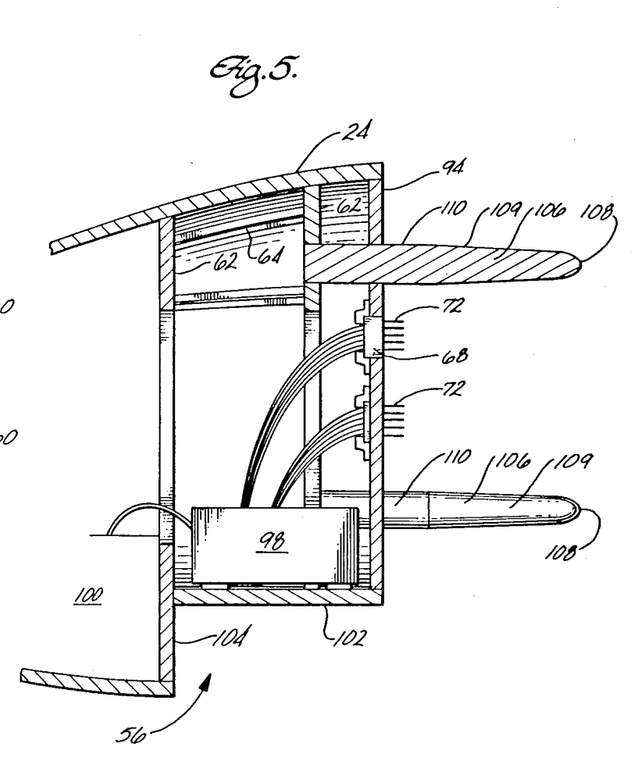
FIG. 5 is a side elevation view of the rear portion of a nose module taken along line 5—5 of FIG. 4.

To mate with and provide for the quick and easy connection to the fuselage 22, each nose module 46, as shown in FIGS. 1, 4, and 5, is provided with a rearmost bulkhead 94. Like the fuselage 22, the nose module 46 includes a framework of rib bulkheads 62 and interconnecting spars 64 to provide structural rigidity for the nose module 46 and a skeleton upon which to affix the outer skin 24. When a selected nose module is mated and secured to a selected fuselage, the external configuration of the nose module 46 augments, completes, and contributes significantly to the overall aerodynamic shape of the aircraft 20.

Within the nose module 46 is defined a compartment 96 within which are disposed avionics, and, if required, mechanical devices such as cameras or the like. Referring to FIG. 5, electrical components 98 and 100 are schematically shown. Of course it is to be understood that, depending upon the desired mission to be flown, the compartment 96 may be devoid of electrical and mechanical equipment and filled with suitable ballast, provided with access ways to store equipment within the nose module 46 for ferrying to another base, or may be sealed to define a fuel tank to enable the aircraft 20 to serve as a tanker.

The nose bulkhead 94 defines the rearmost extremity of the nose module 46. At its lowermost extent, the nose bulkhead 94 terminates at the recess 56 adapted to mate with the tongue 50. The uppermost boundary of the recess 56 is defined by a planar support plate 102 to register with and lie atop the tongue upper surface 52. A rib bulkhead 62 defines the forward wall 104 for the recess 56. As shown in FIG. 4, the skin 24 on the nose module 46 terminates just above the recess 56 so as to mate with the curbs 54 at the tongue 50. Tabs 58 register with notches 60. As can be appreciated, when a selected nose module is mated to the fuselage 22, the skin 24, curbs 54, tabs 58, and tongue 50 are integrated together into a smooth, "clean" aerodynamic shape.

To further define the coupling means guide elements, the nose module is provided with a plurality of pins 106 positioned at the nose bulkhead 46. As shown in the drawings, particularly FIG. 4, the pins 106 are arranged to register with the sleeves 66 of the forward bulkhead when the nose module 46 and fuselage 22 are mated together. Of course, it is to be understood that if the array of sleeves at the fuselage 22 is changed, the pins 106 must be similarly arrayed. To provide for the interchangeability of the nose module 46, each nose module has its pins 106 arranged to register with the sleeves 66. Therefore, regardless of which nose module is sought to be connected to the fuselage 22, the standardized arrangements of the pins 106 and sleeves 66 provide for uniform registry and support of the desired nose module.

Figure 9:
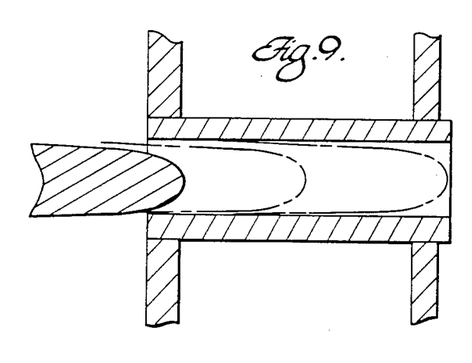
FIG. 9 is a side section view illustrating the insertion of the nose-mounted pins into sleeves disposed at the fuselage for alignment and interconnection of the nose module to the fuselage.

The pins 106 are supported to extend outwardly from the nose bulkhead 94 and may be fashioned from solid steel or the like. To enhance the rigidity of the pins for support of the nose module 46, each pin 106 can also be supported by a rib bulkhead 62 behind (forward of) the nose bulkhead 94 as shown in FIG. 5. Each pin 106 has a conical tip 108 remote from the nose bulkhead 94 cooperable with the sleeves 66 to provide, upon initial engagement of a selected nose module with a fuselage, gross positional alignment between the nose module 46 and the fuselage 22, as shown in FIG. 9. As the nose module 46 is mated to the fuselage 22, the conical contour of the tips 108 finds or seeks registry with the sleeves 66. From the tip 108 to a position just forward of the nose bulkhead 96, each pin 106 is slightly tapered to define a body 109. The slight tapering of each pin, to increase in diameter from the tip 108 rearward, further enables the pins 106 to seek fine positional alignment with the sleeves 66 in response to the movement of the nose module 46 toward the fuselage 22. Adjacent to the nose bulkhead 94, each pin has a trunk 110 of a diameter to be closely received into the corresponding sleeve 66. As the nose module 46 is mated to the fuselage 22, the tips 108 and tapered bodies 109 find and register with each of the corresponding sleeves 66. As the nose module 46 is mated to the fuselage 22, the tongue 50 is closely received into the recess 56 while the trunks 110 of the pins 106 closely register with and provide fine positional alignment of the nose module 46 onto the fuselage 22. As can be appreciated, the aforementioned alignment of module 46 to the fuselage 22 is automatic and progressive, thereby not requiring precise initial alignment of the pins 106 with the sleeves 66. Accordingly, the nose module 46 can quickly be mated to a selected fuselage 22, the pins 106 providing for automatic positive alignment therebetween.

It should be noted that the drawings show, and the above description has set forth, the guide elements as consisting of three pairs of cooperating pins and sleeves. While two such cooperating pairs may be sufficient to provide for the aforesaid alignment and support of a selected nose module onto a selected fuselage, three or more such pairs are preferred. Should one of the pins fail, shear and torsional support of the nose module to the fuselage will not be lost.

The connection means also include means to electrically connect the electronics in a nose module 46 with those in a fuselage 22. Such a connection is necessary to supply/transmit data between the instrument panel (not shown) in the cockpit 26 and any electrical equipment in the nose module 46. The use of hand-connected plugs or the like would be unsatisfactory; connecting such plugs would be time consuming and difficult in that personnel, some of limited skill, would be required to physically make the connection while the nose module 46 is closely spaced from the fuselage 22. Furthermore, means would have to be provided to take up any slack in the electrical wires as the nose module and fuselage are mated to prevent pinching and severing of the wires. A further problem to be overcome is that the alignment of any nose module to a selected fuselage cannot be assured to occur with such a degree of precision that ordinary plug-type connectors would automatically mate. Typically, such ordinary connectors require very fine alignment in order for some of the connector plugs to align with the corresponding holes in the connector receptacles. Slight misalignment can frustrate registry between the plug connections or result in damage. Designing such a degree of precision into the mechanical coupling means would be expensive and impractical.

To automatically define and establish the electrical connection between the avionics in the nose module 46 and those in the fuselage 22, in a manner to overcome the difficulties and problems noted above, self-aligning coupling means are provided which are engaged as the nose module is mechanically mated to the aircraft fuselage. The connecting means include male plugs 68 (FIGS. 4 and 5) at the nose module 46, and female receptacles 70 positioned at the forward bulkhead 38. Of course it is to be understood that the location of the plugs and receptacles may be reversed as desired. Each male plug 68 includes a plurality of connector pins or prongs 72, which carry electrical signals between one or more electronic components in the nose module 46 and a suitable panel instrument, display or device at the cockpit. Each female receptacle 70 at the forward bulkhead 38 has a mating array of holes 74, adapted to receive the pins 72 of the corresponding male plug 68. A portion of or the entire extent of the holes 74 includes a conductive liner 76. The liners 76 of the female receptacles 70 are incorporated into the electrical circuitry at the fuselage 22 by an appropriate wire bundle 78 or the like.

Figure 6:
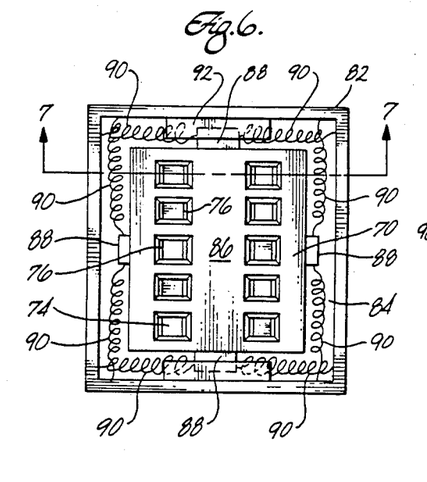
FIG. 6 is a front view of a female receptacle for the electrical connection means between the nose module and the fuselage.
Figure 7:
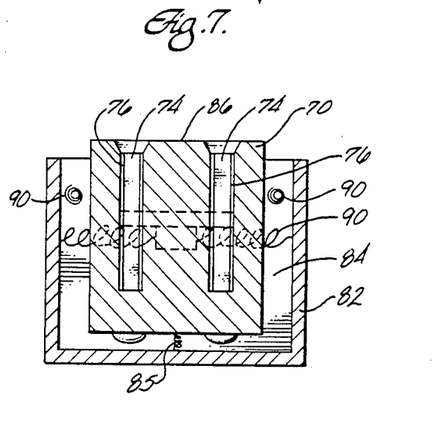
FIG. 7 is a top plan view of the receptacle of FIG. 6 taken along line 7—7 thereof.
Figure 8:
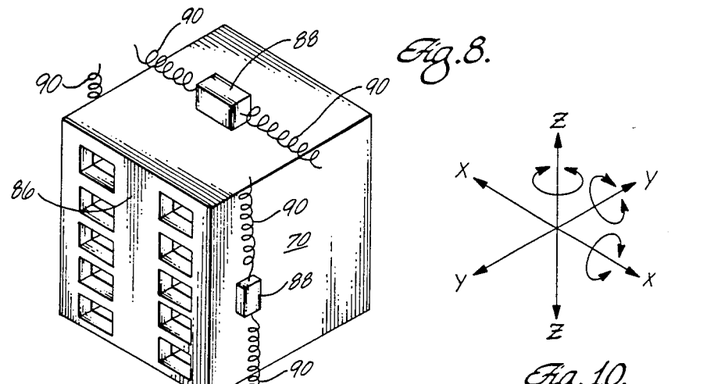
FIG. 8 is a perspective view of the receptacle apart from its containing housing illustrating the preferred six degrees of movement thereof.

For good, consistent electrical interconnection between the electronics at the nose module 46 and the fuselage 22, each pin 72 must be closely received into the corresponding hole 74 at the female receptacle. Misalignment during mating of the nose module to the fuselage could bend or break one or more pins 72 preventing electronic signals from passing between the nose module and the fuselage. While the female receptacle 70 can be constructed such that each hole 74 has a tapered lead-in as shown in FIGS. 6 through 8 on the order of 0.030 inch, the lead-in would tend to bend the pins 72 if both the male plug and female receptacle were fixed and exact alignment of a nose module to the fuselage were not present.

As stated above, the alignment and mating of a selected nose module to a fuselage cannot, in all circumstances, assure to the precise degree necessary that each pin 72 will be aligned to register with the corresponding hole 74. Therefore, the major elements of each electrical connector (i.e., each pair of plugs 68 and receptacles 72) are mounted and cooperatively arranged relative to each other to accommodate six degrees of freedom of motion between them and to mate with each other as the nose module is moved into its secure mated engagement with the fuselage. Such accommodation can be achieved by affording one or the other of the plug and receptacle six degrees of freedom of motion relative to its supporting structure, by distribution between the plug and the receptacle of six degrees of freedom of motion, or by allowing either or both of the plug and receptacle to have less than six degrees of motion while otherwise accommodating any degrees not actually afforded.

FIGS. 6–10 illustrate the presently preferred arrangement for accommodating six degrees of motion between the plugs and receptacles comprising the electrical connections in the preferred practice of this invention. Thus, to implement the preferred motion accommodation arrangement, the electrical coupling means includes a floating mount 80 for the female receptacle 70 at the forward bulkhead 38. The floating mount 80 is adapted to permit the female receptacle 70 to move and rotate to a limited extent, in six degrees of freedom, to accommodate any tolerances which may arise during the act of mating a nose module to a fuselage via the coupling means described above.

The floating mount 80, in one embodiment and as shown in FIGS. 3, 6–8, and 10, consists of a box 82 disposed at and flush with the forward bulkhead 38. The box 82 defines a cubicle 84 to house the female receptacle 70. When the female receptacle 70 bottoms in the cubicle 84, the box 82 and female receptacle 70 are sized such that the face 86 of the female receptacle 70 is flush with the forward bulkhead 38. A spring 85 can be provided to normally urge the female receptacle 70 in a direction outward from the box 82.

The floating mount 80 is adapted to normally support the female receptacle 70 substantially centered within the cubicle 84 as shown in FIG. 6. For this purpose, the female receptacle 70 is provided at both its top and bottom and at its sides with a tang 88, each tang 88 supporting one end of elastic supports such as springs 90. The other ends of the springs 90 are secured to the box 82. Normally the springs 90 are kept at equal tension, preventing the female receptacle 70 from moving within the cubicle 84. As shown in FIG. 8, the floating mount 80 enables the female receptacle 70 to move in six degrees of freedom. Those six degrees of freedom are illustrated as movement in the X, Y, and Z directions and in rotation about each of the X, Y, and Z axes. By virtue of the springs 90, movement of the female receptacle 70 in any of the degrees of freedom is resisted by spring force, which results from the displacement of one or more of the tangs 88. As can be appreciated and as will be described in detail below, when the fixed male plug 68 approaches the female receptacle 70, the pins will register with the lead-ins. In response to movement of the male plug 68 and nose module 46 toward the fuselage, the angular arrangement of the lead-ins will urge the female receptacle 70 to move within a cubicle 84 to a position wherein the prongs 72 register with the holes 74. As the pins 72 are inserted into the holes 74, resistance is encountered which causes the receptacle 70 to bottom in the box 82. Upon bottoming of the receptacle 70 in the box 82, spring 85 is fully compressed. Thereafter, movement of the male plug 68 results in insertion of the pins 72 into the corresponding holes 74 for intimate electrical contact with the liners 76. At such point the electrical coupling is accomplished.

To remove the nose module 46 from the fuselage 22, the nose module 46 is disconnected and pulled away from the fuselage 22. In so doing, the male plug 68 is pulled from the female receptacle 70. The initial movement of the male plug 68, due to the interference fit between the pins 72 and the liners 76, pulls the female receptacle 70 in a direction outwardly from the box 82. To prevent complete removal of the female receptacle 70, stops 92 are disposed in the cubicle 84 to engage the tangs 88. Upon engagement, movement of the female receptacle 70 is halted, whereupon continued separation of the nose module 46 from the fuselage 22 removes the pins 72 from the corresponding holes 74.

Of course, it is to be understood that other types of floating mounts can be provided for the female receptacle 70. For example, the space surrounding the female receptacle 70 in the cubicle 84 may be filled with a resilient material, such as rubber, to permit the female receptacle to move in the aforesaid six degrees of freedom for registry with the male plug 68.

Accommodation in the electrical connections of six degrees of motion between a nose module and a fuselage can be accomplished in ways other than the preferred way described above. For example, female receptacle 70 could be mounted to be immovable fore and aft relative to the fuselage, and motion accommodation in this direction can be achieved by making the male connector pins 72 sufficiently long to accommodate fit, positioning and tolerance variations in this direction.

Figure 10:
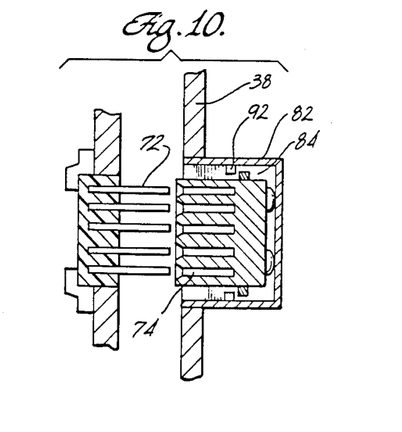
FIG. 10 is a side section view of the electrical connection means showing interconnection thereof as the nose module is coupled to a fuselage.

To provide for the electrical connection between the components in the nose module 46 and controls/monitoring electronics in the fuselage, the connection means includes one or more of the male plugs 68 fixed such that the pins 72 project rearwardly from the nose bulkhead 94, as shown in FIG. 5. Depending upon the type and number of electronics within the nose module 46, a number of male plugs 68, shown as four in FIG. 4, may be provided. Of course, the number of male plugs 68 can increase or decrease as desired. Each of several of the male plugs 68 couples with a corresponding female receptacle 70 at the forward bulkhead 38. As shown in FIG. 10, as the nose module 46 nears the fuselage 22, each of the pins 72 registers with the holes 74 of each female receptacle 70 in the manner described above.

Since the electrical components within the nose module can vary depending upon the missions sought to be carried out, control and monitoring instrumentation actually used at the cockpit likewise varies. Instruments at the instrument panel required during, for example, electronic countermeasures may not be required when the aircraft 20 is modified by the appropriate nose module 46 to function as a photoreconnaissance aircraft. Such being the case, the instrument panel is provided with sufficient instrumentation and controls to control, monitor, and operate any one of a number of modules. Accordingly, for certain nose modules some or much of the instrumentation and/or controls at the instrument panel would become non-functional.

Figure 16:
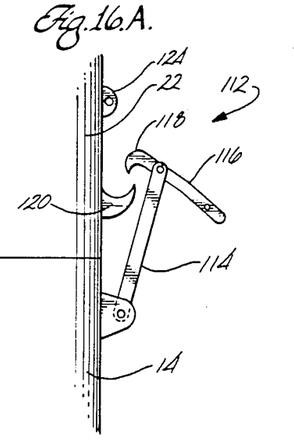
FIGS. 16A and 16B show the clamping means for clamping a selected nose module/tail module to the fuselage.

To secure the mated nose module 46 to the fuselage 22, attachment means such as overcenter clamps 112, shown in FIG. 16, can be used. The overcenter clamps include a pivot arm 114 connected to the nose module 46. Mounted to the end of the pivot arm 114 is a lever arm 116 having connected thereto a finger 118. The overcenter clamps 112 are positioned such that the finger 118 engages a corresponding lip 120 securely mounted to the fuselage. Preferably the lips 120 are disposed at the tabs 58 and at the tongue 50. As can be appreciated from FIG. 16, once the nose module 46 has been mated to the fuselage 22, the overcenter clamp 112 is operated such that the finger 118 is positioned to engage the corresponding lip 120. Rotating the lever arm 116 causes the finger 118 to securely grasp the lip 120, continued movement of the pivot arm 114 locking the finger 118 against the lip 120. The contact point between the finger 118 and lip 120 is located nearer the fuselage than is the pivot point for the lever arm, producing a moment on the overcenter clamp 112, holding it against the fuselage 22. If desired, a clevis pin 122 can be cooperatively passed through an eyelet 124 on the fuselage 22 and the lever arm 116 to further prevent the overcenter clamp 112 from releasing. Accordingly, upon alignment and mating of nose module 46 to the fuselage, the overcenter clamps are manipulated to securely hold the nose module 46 to the fuselage 22. If desired to reduce drag, the clamps 112 can be located in recesses at the fuselage which are covered by suitable closable doors.

Turning to FIGS. 11 through 15, another embodiment of the aircraft 20 is shown. In this embodiment illustrated, the aircraft 20 is provided with a removable tail module 126. Like the nose module 46, the tail modules 126 are adapted to be interchanged between like aircraft; each tail module is adapted to provide the aircraft 20 with different mission capabilities. For example, a tail module can be provided with electronics to give the aircraft 20 rear-looking radar or the like. Another tail module can be fitted with electronic countermeasures equipment. Of course, it is to be understood that the foregoing functions of tail modules are merely by way of illustration, since other tail modules could be fitted with different electronic/mechanical features.

Figure 11:
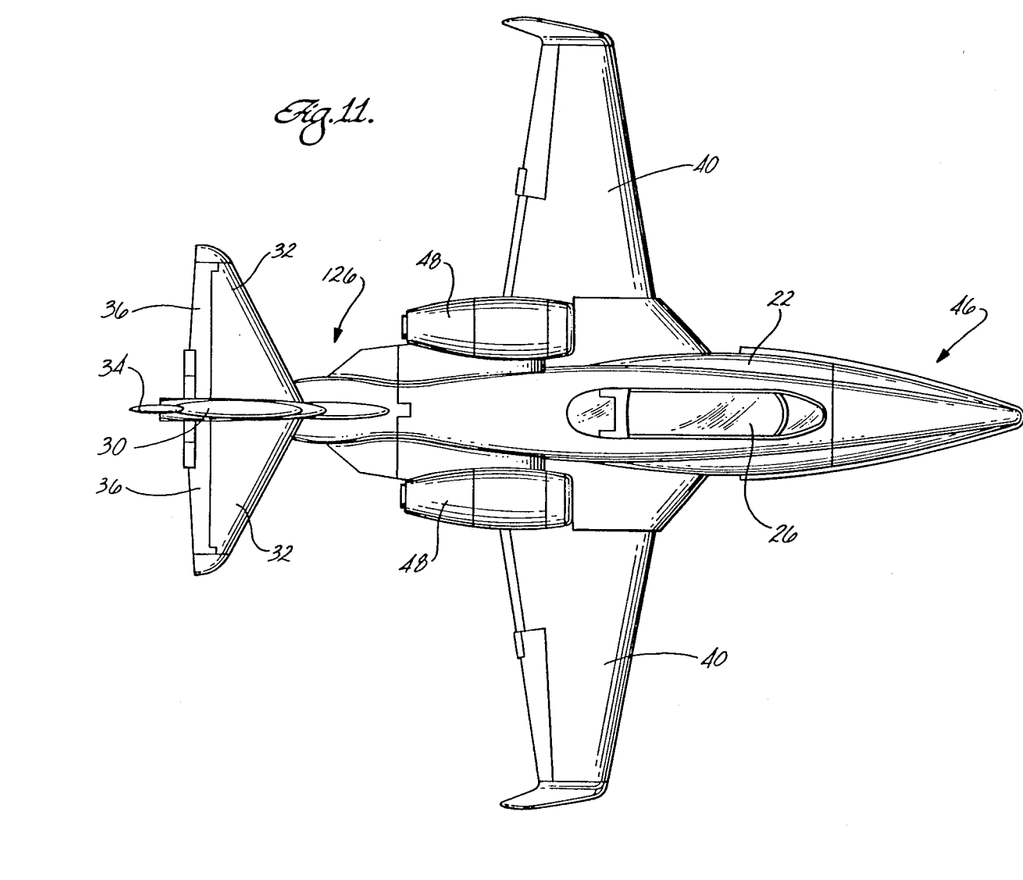
FIG. 11 is a top view of the aircraft according to the present invention illustrating both interchangeable nose modules and tail modules.
Figure 12:
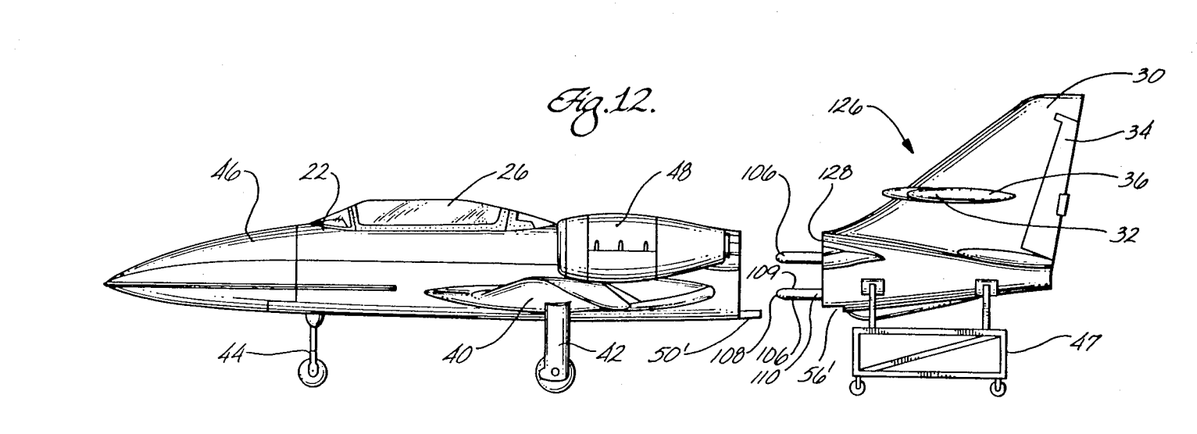
FIG. 12 is a side view of the aircraft showing the tail module removed from the fuselage.

As can be seen from FIG. 11, the separation between the tail module 126 and the fuselage 22 is just aft of the jet engines 48 and ahead of the vertical stabilizer. The tail module includes the vertical stabilizer and horizontal stabilizers along with the rudder and elevators as described above.

Figure 13:
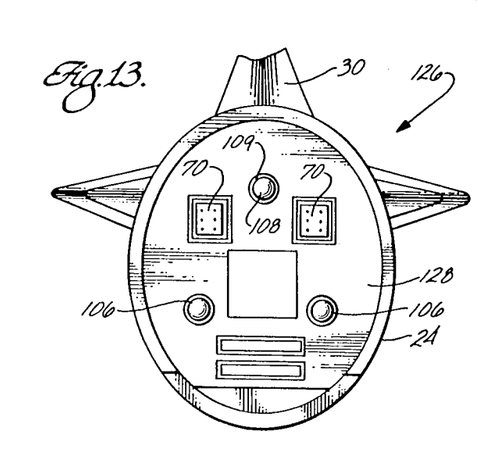
FIG. 13 is a front view of the tail module showing alignment pins and other couplings for interconnection of the tail module to the fuselage.
Figure 14:
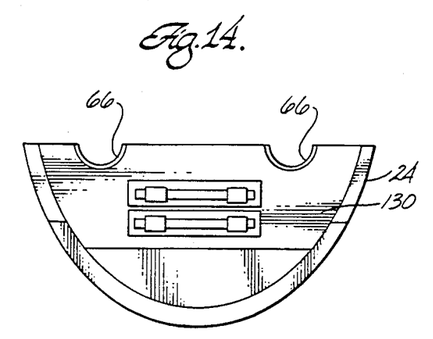
FIG. 14 is a partial rear view of the fuselage adapted to mate with the interchangeable tail modules.
Figure 15:
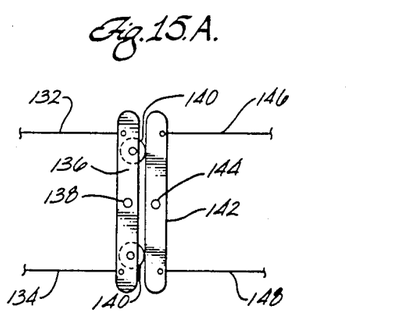
FIGS. 15A and 15B are schematic illustrations of the push-push connection between the fuselage and the tail module for operation of the control services.

To provide for the quick and easy interchange of tail modules, each tail module 126, much like the nose modules discussed above, is provided with a forward-most tail bulkhead 128 (FIG. 13). The tail bulkhead 128 includes a plurality of pins 106, shown as three, each of which is adapted to align and mate with a corresponding sleeve 66 located on a rear bulkhead 130 (FIG. 14) at the aft end of the fuselage 22. As described above with reference to the nose module, each pin 106 has a tip 108 and body 109 to align the tail module 126 to the fuselage with a trunk 110 to be closely received into the corresponding sleeve 66 for fine alignment of the mating of the tail module 126 to the fuselage 22. Also, in a manner similar to that described above, a tongue 50' projects rearwardly of the rear bulkhead 130 to be received in a recess 56' at the tail module 126. The pins 106 and tongue 50' cooperate to support the tail module 126 on the fuselage 22.

To provide for the electrical connection between components in the tail assembly 126 and instrumentation and controls in the fuselage and cockpit, electrical connection means, including male plugs 68 and female receptacles 70 similar to those described above with reference to the nose module, are provided at, respectively, the rear bulkhead 130 and tail bulkhead 128. Accordingly, as the selected tail module 126 is mated to the fuselage 122, the pins 106 provide for first gross positional alignment and, as they become inserted into the sleeves 66, fine positional alignment of the interconnection between the tail module and the fuselage. In conjunction with the mating of the tail module 126 to the fuselage 22, the pins 72 in the male plugs 68 register with the holes 74 of the female receptacle 70, providing a coupling between electrical components in the tail module 126 and those in the fuselage 22.

To provide for pilot control of the control surfaces (i.e., rudder and elevators) at the tail module 126, the aircraft 20 has push-push control means. For example, with reference to the rudder, FIGS. 15A and B illustrate the push-push control. It is to be understood that the same type of push-push controls are adapted to operate the elevators in response to pilot manipulation of a control stick or wheel at the cockpit. The push-push controls include a pair of master lines 132 and 134 disposed in the fuselage 22 and coupled to the control stick or pedals. If desired, hydraulic assist may be provided for manipulation of such lines. Each of the master lines 132 and 134 is connected to one end of a master crank 136 pivotally mounted at the rear bulkhead 130. The master crank 136, shown in FIG. 15B, in response to operation of the control stick, causes the master lines 132 and 134 to pivot the master crank 136 about its pivot 138. The movement of the master crank 136 is transmitted by a pair of rollers 140 disposed on the master crank 136 to a slave crank 142, pivotally mounted at the tail bulkhead 128. The slave crank 142 shown in FIG. 15B pivots about its pivot 144 to manipulate a pair of slave lines 146 and 148. The slave lines 146 and 148 are coupled to the rudder 34. Accordingly, pilot operation of the control stick via the master lines 132 and 134, master crank 136, slave crank 142, and slave lines 146 and 148, operate the aforesaid rudder in a push-push fashion. The elevators 36 are operated in the same manner via a master crank 150 and a slave crank 152.

As can be appreciated by virtue of the pins 106 and other features described above, a selected tail module can be interconnected to a selected fuselage quickly and easily and is virtually automatically aligned as the tail module is mated to the fuselage 22. At mating, electrical and push-push control connections are automatically made. As can be appreciated, the foregoing permits tail modules 126 to be quickly and easily interchanged to the fuselage 22 by a minimum number of personnel.

As can be understood from the foregoing, any selected nose or tail module may be interchangeably connected to a selected fuselage. Each such module is externally substantially identical in shape and mass distribution so that the flight characteristics of the aircraft will not significantly change from mission to mission.

After the tail assembly 126 has been mated to the fuselage, overcenter clamps 112 are provided to secure the connection.

While we have shown and described certain embodiments of the aircraft according to the present invention, it is to be understood that it is subject to modification without departing from the scope of the claims hereinafter set forth.

What is claimed is:

1. An aircraft with interchangeable sections of fuselage, said aircraft comprising:
a basic fuselage having a longitudinal centerline and including a cockpit with controls, a wing structure and flight propulsion means, said basic fuselage having an internal load-bearing structure and an external skin and including at at least one end thereof a transverse, generally planar bulkhead and a structurally integral tongue axially extending from the bottom of said basic fuselage beyond said bulkhead;
a set of at least two fuselage sections each having an internal load-bearing structure and an external skin and a transverse, generally planar bulkhead at a mating end thereof, each said section being interchangeably connectable at the mating end thereof to the one end of said basic fuselage and being so shaped to complete the aerodynamic configuration at said one end of said aircraft, said sections being adapted to operatively support different mission-specific equipment;

first means for structurally connecting each said section with said one end, said first connecting means comprising notch means at the bottom of each said section for matingly receiving said tongue in supporting engagement with the load-bearing structure thereof, coupling means for defining and supporting each said section in predetermined mated relation with the one end of said basic fuselage, said coupling means including a radially-spaced array of elongated coupling elements fixed to the load-bearing structure of and axially extending through the bulkhead of one of said basic fuselage and sections and a radially-spaced array of elongated receiving elements fixed to the load-bearing structure of and open for cooperatively receiving said coupling elements through the bulkhead of the other of said basic fuselage and sections, said coupling and receiving elements cooperating to progressively align said sections with said one end during movement of said sections toward said one end and to support said sections in said mated relation, and means radially spaced from said coupling means for fixing said sections to said one end; and second means for operatively connecting said sections to said one end, said second connecting means comprising male and female electrical connectors mounted in cooperative relation in the respective bulkheads of said sections and said basic fuselege, at least one of said electrical connectors being resiliently mounted to accommodate six degrees of misalignment with said other electrical connector during movement of said sections into mated relation.

2. The aircraft of claim 1 wherein said one end is the forward end of said basic fuselage and said sections are interchangeable nose modules.

3. The aircraft of claim 1 wherein said one end is the aft end of said basic fuselage and said sections are interchangeable tail modules.

4. The aircraft of claim 3 wherein said tail modules include aerodynamic control surfaces and means extending between said control surfaces and the bulkhead of said module for moving said surfaces, and wherein said second connecting means comprises means cooperatively mounted in the bulkhead of each of said tail modules and said basic fuselage for operatively connecting the moving means with the controls in said cockpit when said tail modules are moved into mated relation with said basic fuselage.

5. The aircraft of claim 1 wherein said basic fuselage includes a bulkhead and tongue at each axial end thereof and wherein said aircraft includes two sets of at least two fuselage sections, one set being nose modules and the other set being tail modules.

6. The aircraft of claim 1 wherein said first connecting means includes a plurality of tabs of said skin axially extending beyond said bulkhead of one of said sections and basic fuselage and a plurality of cooperatively disposed slots in the skin of the other of said sections and basic fuselage, said slots axially receiving said tabs when said sections are moved into mated relation said basic fuselage.

7. The aircraft of claim 6 wherein said fixing means are located in conjunction with said tabs and slots.

8. An aircraft with interchangeable sections of fuselage, said aircraft comprising:

a basic fuselage including a cockpit, said basic fuselage terminating at at least one axial end thereof with a transverse bulkhead;

a set of at least two fuselage sections, each section having a mating end disposed for selective mating engagement with said one end;

means for supporting said sections when in mating engagement with said one end, said supporting means including a tongue axially extending from the bottom of said basic fuselage beyond said bulkhead and a cooperatively disposed notch in the mating end of said sections for receiving in supporting engagement said tongue when said sections are disposed in mating engagement with said one end;

means for guiding engagement of said sections with said one end and for supporting said sections when in mating engagement with said one end, said guiding and supporting means comprising a plurality of radially-spaced fingers and a plurality of cooperatively disposed tubes for axially receiving said fingers distributed between said one end and the mating ends of said sections, said fingers being tapered for a substantial part of their axial length to gradually align said sections with said one end during insertion of said fingers in said tubes and having a terminal portion of their axial length which corresponds in size and shape to the bore of said tubes for supporting said sections when in mating engagement with said one end; and means for selectively preventing relative axial movement between said one end and the mating ends of said sections when in mating engagement, said preventing means being separate and spaced from said guiding and supporting means.

* * * * *